US012647912B2

(12) United States Patent
Xiao

(10) Patent No.: US 12,647,912 B2
(45) Date of Patent: Jun. 2, 2026

(54) TIMING CONTROL METHOD, ELECTRONIC DEVICE, AND STORAGE MEDIUM

(71) Applicant: Beijing X-Ring Technology Co., Ltd., Beijing (CN)

(72) Inventor: Liwu Xiao, Shanghai (CN)

(73) Assignee: Beijing X-Ring Technology Co., Ltd., Beijing (CN)

( * ) Notice: Subject to any disclaimer, the term of this patent is extended or adjusted under 35 U.S.C. 154(b) by 366 days.

(21) Appl. No.: 18/427,634

(22) Filed: Jan. 30, 2024

(65) Prior Publication Data

US 2025/0048286 A1     Feb. 6, 2025

(30) Foreign Application Priority Data

Aug. 4, 2023     (CN) .......................... 202310982489.6

(51) Int. Cl.
*H04W 56/00*          (2009.01)

(52) U.S. Cl.
CPC ..... *H04W 56/001* (2013.01); *H04W 56/0045* (2013.01)

(58) Field of Classification Search
CPC ........................ H04W 56/001; H04W 56/0045
See application file for complete search history.

(56) References Cited

U.S. PATENT DOCUMENTS

| | | | | | |
|---|---|---|---|---|---|
| 12,177,889 | B2 * | 12/2024 | Yi | ...................... | H04W 72/0453 |
| 2017/0086153 | A1 * | 3/2017 | Yoon | ................... | H04W 56/001 |
| 2018/0262313 | A1 * | 9/2018 | Nam | ...................... | H04L 5/0044 |
| 2018/0359149 | A1 * | 12/2018 | Shaheen | ........... | H04W 72/0453 |
| 2019/0313411 | A1 * | 10/2019 | Ly | ...................... | H04W 72/0453 |
| 2021/0243753 | A1 * | 8/2021 | Kim | ..................... | H04W 72/51 |
| 2021/0282037 | A1 * | 9/2021 | Zhao | ...................... | H04L 1/0026 |
| 2022/0046564 | A1 * | 2/2022 | Shimoda | ........... | H04W 56/0095 |
| 2022/0279367 | A1 * | 9/2022 | Hwang | ................. | H04W 24/08 |
| 2023/0131322 | A1 * | 4/2023 | Huang | ................. | H04L 5/0048 |
| | | | | | 370/329 |

FOREIGN PATENT DOCUMENTS

EP          3962212 A1     3/2022

OTHER PUBLICATIONS

European Patent Application No. 24155766.9, Search and Opinion dated Aug. 7, 2024, 8 pages.

* cited by examiner

*Primary Examiner* — Ajay Cattungal
(74) *Attorney, Agent, or Firm* — Cozen O'Connor

(57)          ABSTRACT

The disclosure provides a timing control method, a timing control apparatus, an electronic device, a chip, and a storage medium. The method includes: tracking, with a first subcarrier spacing, a reference signal sent by a network device, to obtain a timing offset; adjusting a time unit corresponding to a second subcarrier spacing according to the timing offset; and performing carry system counting on a time unit corresponding to the first subcarrier spacing when a length of the time unit corresponding to the second subcarrier spacing is reached. Therefore, time units corresponding to different subcarrier spacings may be adjusted and counted associatively and it may also be used to solve the problem of slot misalignment caused by ATC adjustments of different subcarrier spacings as well as the problem of complex or impossible conversion of slot numbers corresponding to different subcarrier spacings when performing handovers on the subcarrier spacings.

20 Claims, 5 Drawing Sheets tracking, with a first subcarrier spacing, a reference signal sent by a network device, to obtain a timing offset — S201 adjusting a time unit corresponding to a second subcarrier spacing according to the timing offset — S202 performing carry system counting on a time unit corresponding to the first subcarrier spacing when a length of the time unit corresponding to the second subcarrier spacing is reached — S203

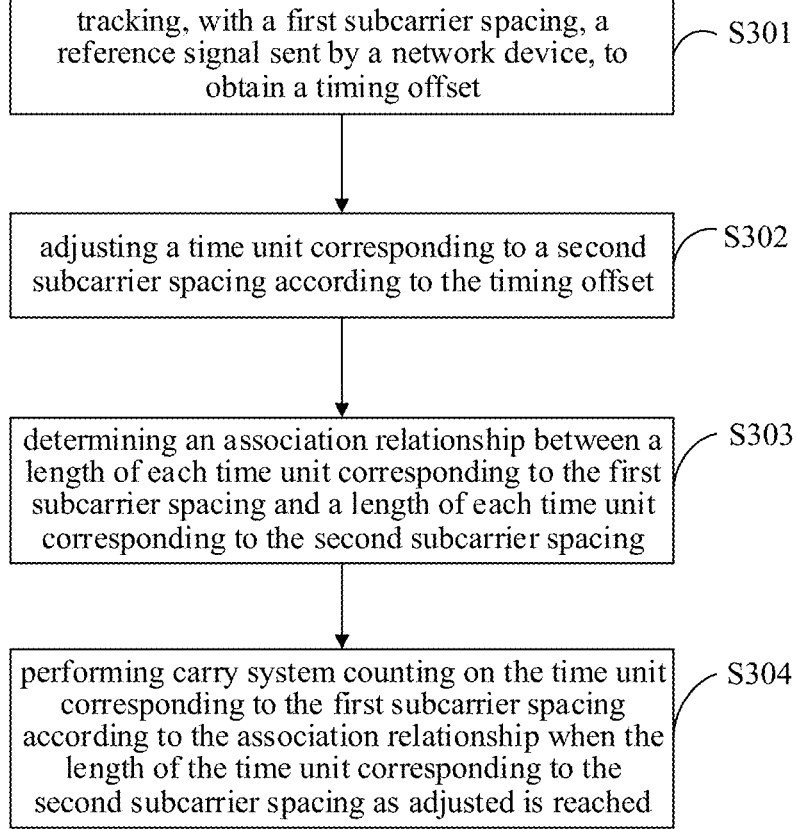

tracking, with a first subcarrier spacing, a reference signal sent by a network device, to obtain a timing offset ⌐ S301 adjusting a time unit corresponding to a second subcarrier spacing according to the timing offset ⌐ S302 determining an association relationship between a length of each time unit corresponding to the first subcarrier spacing and a length of each time unit corresponding to the second subcarrier spacing ⌐ S303 performing carry system counting on the time unit corresponding to the first subcarrier spacing according to the association relationship when the length of the time unit corresponding to the second subcarrier spacing as adjusted is reached ⌐ S304

FIG. 3

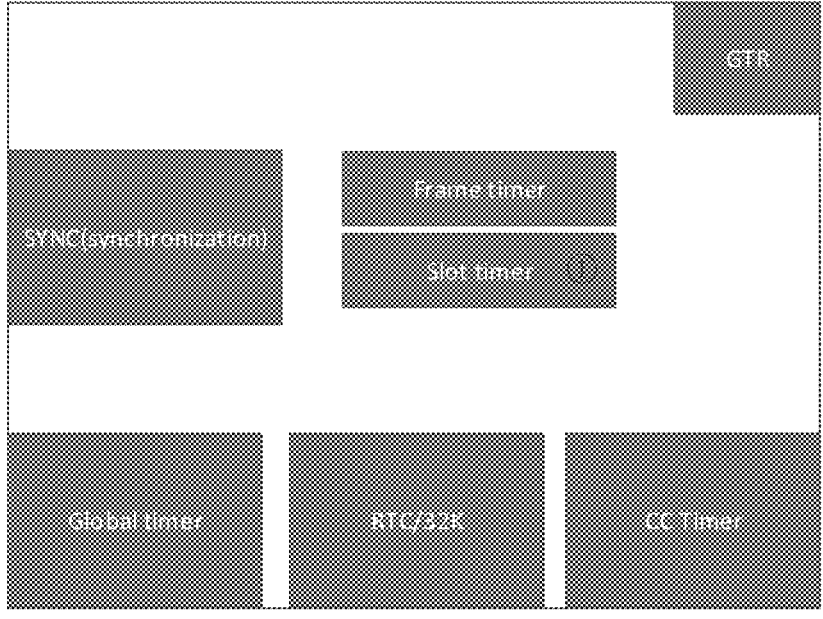

FIG. 4

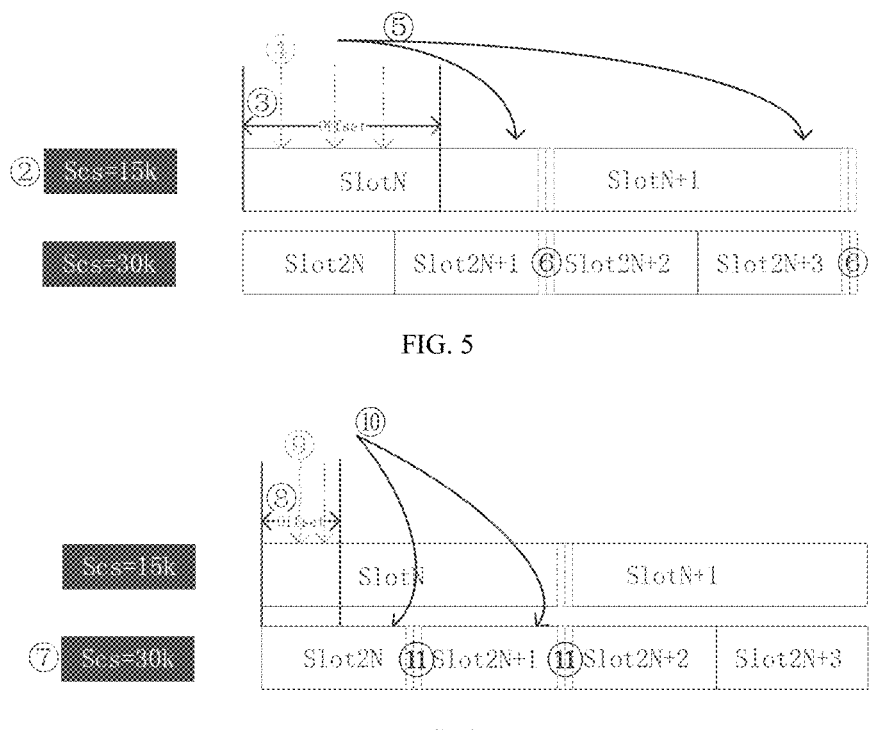

FIG. 5

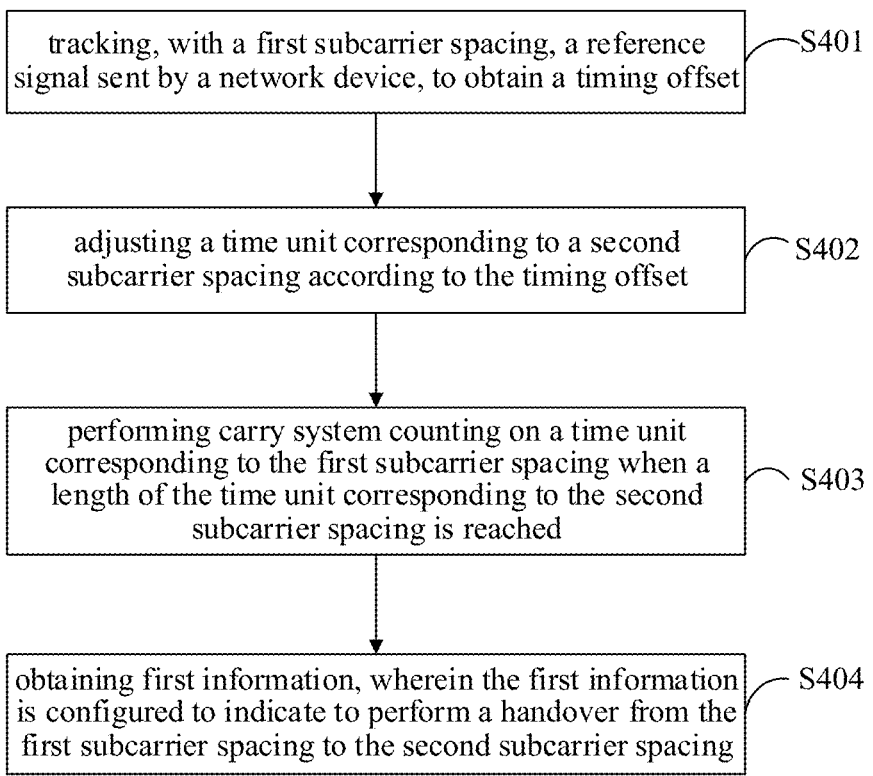

FIG. 6 tracking, with a first subcarrier spacing, a reference signal sent by a network device, to obtain a timing offset — S401 adjusting a time unit corresponding to a second subcarrier spacing according to the timing offset — S402 performing carry system counting on a time unit corresponding to the first subcarrier spacing when a length of the time unit corresponding to the second subcarrier spacing is reached — S403 obtaining first information, wherein the first information is configured to indicate to perform a handover from the first subcarrier spacing to the second subcarrier spacing — S404

FIG. 7

TIMING CONTROL METHOD, ELECTRONIC DEVICE, AND STORAGE MEDIUM

CROSS-REFERENCE TO RELATED APPLICATION

This application is based upon and claims priority to Chinese Patent Application No. 202310982489.6, filed on Aug. 4, 2023, the entire content of which is incorporated herein by reference.

TECHNICAL FIELD

The disclosure relates to the field of wireless communication, and more particularly, to a timing control method, an electronic device, and a storage medium.

BACKGROUND

In the field of wireless communication systems, terminals communicate with network devices over a wireless network. An automatic timing control (ATC) adjustment technology may realize an automatic time adjustment for a terminal and further complete tracking of a network device by the terminal.

SUMMARY

According to a first aspect of the disclosure, a timing control method is provided. The method is performed by a terminal. The method includes: tracking, with a first subcarrier spacing, a reference signal sent by a network device, to obtain a timing offset; adjusting a time unit corresponding to a second subcarrier spacing according to the timing offset; and performing carry system counting on a time unit corresponding to the first subcarrier spacing when a length of the time unit corresponding to the second subcarrier spacing is reached.

According to a second aspect of embodiments of the disclosure, a communication device is provided. The communication device includes: a transceiver; a memory for storing computer-executable instructions; and a processor configured to realize the method described above.

According to a third aspect of embodiments of the disclosure, a non-transitory computer-readable storage medium having stored therein computer-executable instructions is provided. The computer-executable instructions cause a computer to perform the method described above.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 3 is a flow chart of a timing control method according to embodiments of the disclosure.

FIG. 4 is an application scenario diagram of a timing control method according to embodiments of the disclosure.

FIG. 5 is a flow chart of a timing control method according to embodiments of the disclosure.

FIG. 6 is a flow chart of a timing control method according to embodiments of the disclosure.

FIG. 7 is a flow chart of a timing control method according to embodiments of the disclosure.

DETAILED DESCRIPTION

Figure 1:
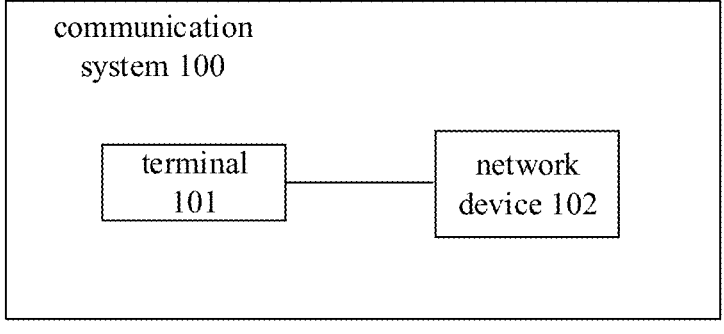
FIG. 1 is a schematic diagram of a communication system according to embodiments of the disclosure.

Reference will now be made in detail to embodiments of the disclosure, examples of which are illustrated in the accompanying drawings, in which the same or similar elements or elements having the same or similar functions are denoted by the same or similar reference numerals throughout the description. Embodiments described herein with reference to accompanying drawings are illustrative and used to explain the disclosure but shall not be construed to limit the disclosure.

To facilitate the understanding of the solutions of the disclosure, the related art involved in the disclosure is introduced below.

In the new radio (NR), bandwidth part (BWP) handovers may be classed into idle→connect→idle→connect and so on, according to the system state. A BWP under an idle state is called as an initial BWP. A BWP under a connected state includes a first active BWP and other BWP(s).

The BWP handovers in the NR may trigger handovers among different subcarrier spacings (SCSs). The subcarrier spacing and the slot number in the NR are illustrated in Table 1.

TABLE 1

| the subcarrier spacing and the slot number in the NR | | | | |
|---|---|---|---|---|
| SCS | | Slot | | |
| $\mu$ | $_{\Delta}f =$ $2^{\mu}*15[\text{kHz}]$ | Slot length | Range of slot numbers | Frequency band supported |
| | | | | FR1 FR2 |
| 0 | 15 k | 1 ms | 0~9 | support not support |
| 1 | 30 k | 0.5 ms | 0~19 | |
| 2 | 60 k | 0.25 ms | 0~39 | support |
| 3 | 120 k | 0.125 ms | 0~79 | not support |
| 4 | 240 k | 0.0625 ms | 0~159 | |
| 5 | 480 k | 0.03125 ms | 0~319 | |
| 6 | 960 k | 0.01565 ms | 0~639 | |

It may be seen from Table 1 that different subcarrier spacings correspond to different ranges of slot numbers and different slot lengths.

The ATC adjustment technology refers to, in the NR, tracking, by a user equipment (UE), a synchronization signal and physical broadcast channel (PBCH) block (SSB), a channel state indication reference signal (CSI-RS), a physical downlink shared channel-demodulation reference signal (PDSCH-DMRS), or the like, which is sent by an access network device, in which one of tracking results is a timing offset (TO); and adjusting, by the UE, a local time boundary (such as a frame header position) on the UE using the TO. That is, the automatic time adjustment of the UE is completed and then the timing tracking of the access network device by the UE is completed.

In the related art, the UE may generate a slot interrupt by setting a timer or by other manners, adjust a position of generating a next slot interrupt according to the ATC adjustment technology, and count the slot interrupt through software or hardware to complete counting the slot number. After performing carrying on the slot number, software or hardware is used to count the frame number, and so on.

However, subcarriers at different spacings in the NR may be handed over. The terminal needs to make the ATC adjustments at different subcarrier spacings, resulting in the slot misalignment. When the subcarrier spacings are handed over, it needs to continue to count the slot number. Because the slot numbers corresponding to different subcarrier spacings are different, the slot number conversion corresponding to different subcarrier spacings is complicated or impossible.

Therefore, a timing control method is provided according to the disclosure to realize that time units (slots or frames, etc.) corresponding to different subcarrier spacings may be adjusted and counted associatively, which may be used to solve the problem of slot misalignment caused by ATC adjustments of different subcarrier spacings as well as the problem of complex or impossible conversion of slot numbers corresponding to different subcarrier spacings when performing handovers on the subcarrier spacings.

To better understand the solutions according to embodiments of the disclosure, a communication system applicable to embodiments of the disclosure is described below. FIG. 1 is a schematic diagram of a communication system according to embodiments of the disclosure. As illustrated in FIG. 1, a communication system 100 may include a terminal 101 and a network device 102. The network device 102 may include at least one of an access network device and a core network device.

According to some embodiments, for example, the terminal 101 includes at least one of: a mobile phone, a wearable device, an Internet of Things device, a vehicle with communication capabilities, a smart vehicle, a portable android device (Pad), a computer with wireless transceiving capabilities, a virtual reality (VR) terminal device, an augmented reality (AR) terminal device, a wireless terminal device in industrial control, a wireless terminal device in autonomous driving, a wireless terminal device in remote medical surgery, a wireless terminal device in smart grid, a wireless terminal device in transportation safety, a wireless terminal device in smart city, a wireless terminal device in smart home, or the like, which is not limited thereto.

According to some embodiments, terms "terminal", "UE", "user terminal", "mobile terminal", "mobile client", "client", and the like are interchangeable.

According to some embodiments, for example, the access network device is a node or a device that accesses the terminal to the wireless network. For example, the access network device includes at least one of: an evolved node B (eNB), a next generation eNB (ng-eNB), a next generation node B (gNB), a node B (NB), a home node B (HNB), a home evolved node B (HeNB), a wireless backhaul device, a radio network controller (RNC), a base station controller (BSC), a base transceiver station (BTS), a base band unit (BBU), or a mobile switching center in a fifth generation (5G) communications system, or a base station, an open base station (Open RAN), or a cloud base station (Cloud RAN) in a sixth-generation (6G) communications system, or base stations in other communication systems, or an access node in a wireless networking (Wi-Fi™) system, or the like, which is not limited thereto.

According to some embodiments, the technical solutions according to the disclosure may be applied to the Open radio access network (RAN) architecture. In this case, interfaces between access network devices or within the access network device involved in embodiments of the disclosure may become internal interfaces of the Open RAN and the flow and information interaction between these internal interfaces may be realized by software or programs.

According to some embodiments, the access network device may include a central unit (CU) and a distributed unit (DU). The CU may also be called as a control unit. The CU-DU structure may be used to separate the protocol layer of the access network device. Some of functions of the protocol layer are centrally controlled by the CU, and the remaining part or all of the functions of the protocol layer are distributed in the DUs. The DUs are centrally controlled by the CU, which is not limited thereto.

According to some embodiments, the core network device may be a single device including one or more network elements (NEs) or multiple devices or groups of devices respectively including all or part of one or more network elements. The network element may be virtual or physical. For example, the core network may include at least one of: an evolved packet core (EPC), a 5G core network (5GCN), a next generation core (NGC), or the like.

According to some embodiments, for example, one or more network elements may include: a policy control function (PCF) network element, an application function (AF) network element, a network application function (NAF) network element, an authentication and key management for applications anchor function (AAnF) network element, a bootstrapping server functionality (BSF) network element, an access and mobility management function (AMF) network element, a user plane function (UPF) network element, a session management function (SMF) network element, a mobility management entity (MME) network element, and the like.

According to some embodiments, the above PCF, AF, NAF, AAnF, BSF, AMF, UPF, SMF, MME network elements are used for "function qualification" and the names are not limited to thereto.

According to some embodiments, the above PCF, AF, NAF, AAnF, BSF, AMF, UPF, SMF, MME network elements may be independent of the core network device.

According to some embodiments, the above PCF, AF, NAF, AAnF, BSF, AMF, UPF, SMF, MME network elements may be part of the core network device 103.

It is understood that the communication system described according to embodiments of the disclosure is for the purpose of more clearly describing the technical solutions according to embodiments of the disclosure and does not constitute a limitation of the technical solutions according to embodiments of the disclosure. It is known to those skilled in the art that, with the evolution of the system architecture and the emergence of new service scenarios, the technical solutions according to embodiments of the disclosure are equally applicable to similar technical problems.

The following embodiments of the disclosure may be applied to, but are not limited to, a communication system 100 or part subject thereof. As illustrated in FIG. 1, each subject is an example, and the communication system may include all or part of subjects in FIG. 1 or include other subject(s) other than FIG. 1. The number and form of each subject are arbitrary and the connection between subjects is an example, such as it may be a connection or a disconnection, a direct connection or an indirect connection, a wired connection or a wireless connection, or the like.

The timing control method, the timing control apparatus, the device, and the storage medium according to embodiments of the disclosure are described in detail with reference to the accompanying drawings below.

Figure 2:
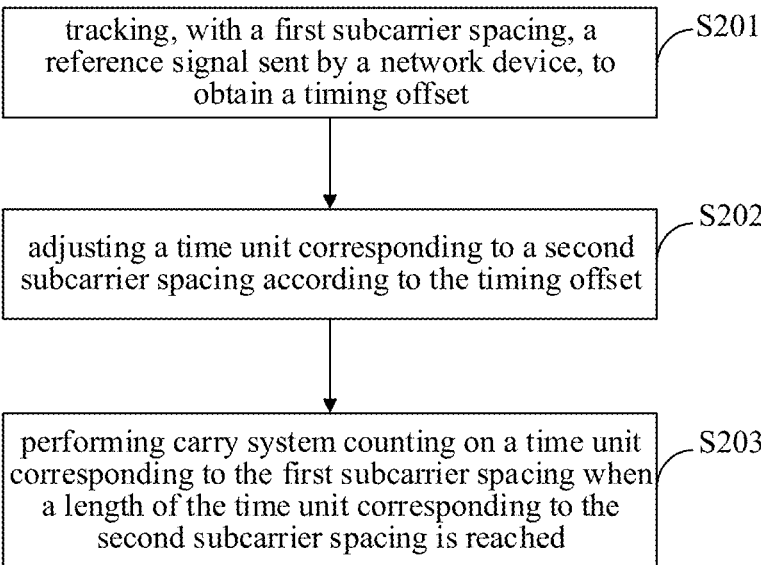
FIG. 2 is a flow chart of a timing control method according to embodiments of the disclosure.

FIG. 2 is a flow chart of a timing control method according to embodiments of the disclosure. The method is performed by the terminal 101. As illustrated in FIG. 2, the timing control method includes the following.

Step 201, a reference signal sent by a network device is tracked with a first subcarrier spacing to obtain a timing offset.

According to the disclosure, the first subcarrier spacing includes a subcarrier spacing currently used by the terminal 101.

According to some embodiments of the disclosure, the terminal 101 may select a BWP desired to be used according to a service scenario. The BWP includes a parameter set. The parameter set includes parameters corresponding to the subcarrier spacing. That is, the terminal 101 may determine that the subcarrier spacing is 15 kHz from the currently used BWP.

According to some embodiments of the disclosure, the reference signal includes at least one of: an SSB, a CSI-RS, a PDSCH-DMRS, or the like, which is not limited thereto in the disclosure.

Step 202, a time unit corresponding to a second subcarrier spacing is adjusted according to the timing offset.

According to some embodiments of the disclosure, the adjustment is made according to the timing offset obtained by tracking with the first subcarrier spacing, using the time unit corresponding to the second subcarrier spacing as a reference.

According to some embodiments, the adjustment is made based on the time unit corresponding to the second subcarrier spacing as the reference when the first subcarrier spacing is used, which ensures the alignment of the time units of the first subcarrier and the second subcarrier.

According to some embodiments, the second subcarrier spacing may be selected to be a larger subcarrier spacing supported and applied by the terminal 101. For example, if the terminal 101 supports and applies subcarrier spacings of 15 kHz and 30 kHz, it may be adjusted based on the time unit corresponding to the subcarrier spacing of 30 kHz as the reference; for another example, if the terminal 101 supports and applies subcarrier spacings of 15 kHz, 30 kHz, and 60 kHz, it may be adjusted based on the time unit corresponding to the subcarrier spacings of 60 kHz as the reference, and the like, which is not limited in the disclosure.

According to some embodiments of the disclosure, the first subcarrier spacing may be the same as the second subcarrier spacing.

According to some embodiments, if the terminal supports a scenario using the first subcarrier spacing including 15 kHz, 30 kH, and 60 kHz for tracking, it may obtain the timing offsets corresponding to the first subcarrier spacing including 15 kHz, 30 kH, and 60 kHz, uniformly use the slot corresponding to the second subcarrier spacing, such as 60 kHz, as the reference, and adjust the timing offsets corresponding to the first subcarrier spacing such as 15 kHz, 30 kH, and 60 kHz, which may solve the problem of slot misalignment in the ATC adjustments in the related art in scenarios where terminals use different subcarrier spacings, in which 15 kHz, 30 kHz, and 60 kHz are example subcarrier spacings and do not constitute a limitation on the application scope of the present solutions.

Step 203, carry system counting is performed on a time unit corresponding to the first subcarrier spacing when a length of the time unit corresponding to the second subcarrier spacing is reached.

For example, the second subcarrier spacing is 30 kHz, the corresponding slot length is 0.5 ms, and the corresponding slot number ranges from 0 to 19 denoted as Solt0~Solt19. The first subcarrier spacing is 15 kHz, the corresponding slot length is 1 ms, and the corresponding slot number ranges from 0 to 9 denoted as Solt0~Solt9. If Solt1 corresponding to the second subcarrier spacing is adjusted, Solt1 is adjusted from 0.5~1 ms to 0.5~1.3 ms in the time domain, Solt1 of the second subcarrier spacing corresponds to Solt0 of the first subcarrier spacing in the time domain, and when 1.3 ms is reached, the slot number of the first subcarrier spacing may be performed with carry system counting, it is counted from 0 to 1, and the start of Solt1 of the first subcarrier spacing is 1.3 ms.

In conclusion, the timing control method provided in the disclosure is performed by the terminal 101 and includes: tracking, with a first subcarrier spacing, a reference signal sent by a network device 102, to obtain a timing offset; adjusting a time unit corresponding to a second subcarrier spacing according to the timing offset; and performing carry system counting on a time unit corresponding to the first subcarrier spacing when a length of the time unit corresponding to the second subcarrier spacing is reached, so that time units (such as slots or frames) corresponding to different subcarrier spacings may be adjusted and counted associatively and it may solve the problem of slot misalignment caused by the ATC adjustments of different subcarrier spacings in the related art.

Based on embodiments in FIG. 2, FIG. 3 is a flow chart of a timing control method according to the disclosure, which is performed by the terminal 101. It should be noted that steps 303 and 304 are further disclosed to step 203 in the embodiments in FIG. 2.

According to some embodiments of the disclosure, FIG. 4 is an application scenario diagram of a timing control method according to the disclosure. As illustrated in FIG. 4, it is a timing system in the terminal 101 and may achieve the startup timing of the terminal 101. The hardware includes a frame timer, a slot timer, a global timer, a real-time clock (RTC), a component carrier (CC) timer, etc., and also includes SYNC (synchronization). The SYNC may transmit certain standard time information to synchronize the time of the entire system.

According to some embodiments of the disclosure, by improving the slot timer, the timing tracking function of the component carrier and the counting and carrying function of the slot number and frame number in the NR may be simultaneously completed using the slot timer.

As illustrated in FIG. 3, the method includes the following steps.

Step 301, a reference signal sent by a network device 102 is tracked with a first subcarrier spacing to obtain a timing offset.

Due to the influence of the movement of the terminal 101 or the influence of temperature changes and the like on the crystal oscillator in the timer, there may be a deviation in the synchronization of receiving time and transmitting time between the terminal 101 and the network device 102. Therefore, it is necessary to adjust the local time.

According to some embodiments of the disclosure, the terminal may use the first subcarrier spacing to receive the reference signal sent by the network device 102; and determine the sampling point deviation corresponding to the reference signal; and determine the timing offset according to the sample point deviation.

According to some embodiments of the disclosure, the timing offset refers to one or more timing offsets obtained on one or more time units corresponding to the first subcarrier spacing.

According to some embodiments of the disclosure, the time unit corresponding to the first subcarrier spacing may include a slot, a frame, or the like of the first subcarrier spacing. For example, if the first subcarrier spacing is 15 kHz, the slot length corresponding to the first subcarrier is 1 ms, the frame length is 10 ms, the slot number range corresponding to the first subcarrier is 0-9, and the slots corresponding to the first subcarrier may be represented as Solt0-Solt9. For example, the first subcarrier spacing may also be 30 kHz, 60 kHz, etc., which is not limited in the disclosure.

According to some embodiments of the disclosure, when the terminal 101 tracks, with the first subcarrier spacing, the reference signal sent by the network device 102, it may track once or multiple times on a slot corresponding to the first subcarrier spacing, such as once or multiple times on a slot corresponding to Solt0, to obtain one or more timing offsets, or once or multiple times on multiple time units corresponding to the first subcarrier spacing, such as Solt0, Solt3, Solt5, etc., to obtain multiple timing offsets, which is not limited in the disclosure.

Step 302, a time unit corresponding to a second subcarrier spacing is adjusted according to the timing offset.

According to some embodiments, if the first subcarrier spacing and the second subcarrier spacing are different, it is necessary to convert the timing offset from the count value of the first subcarrier spacing to the count value of the second subcarrier spacing. The timing offset may include a positive value or a negative value. The data frame header corresponding to the slot of the second subcarrier spacing is adjusted and the slot of the second subcarrier spacing may undergo frame expansion or frame contraction.

For example, if the second subcarrier spacing is 30 kHz, SlotN corresponding to the second subcarrier spacing is 1 ms~1.5 ms. If the converted timing offset is +0.2 ms, the frame header of SlotN is adjusted to 1 ms~1.7 ms, and SlotN will undergo frame expansion. If the converted timing offset is −0.2 ms, the frame header of SlotN is adjusted to 1 ms~1.3 ms, and SlotN will undergo frame contraction.

According to some embodiments of the disclosure, adjusting the time unit corresponding to the second subcarrier spacing according to the timing offset includes: determining an adjustment effective duration for the terminal 101; and adjusting the time unit corresponding to the second subcarrier spacing according to the timing offset during the adjustment effective duration.

According to some embodiments, after inputting the timing offset and adjusting, it takes a period of time to calculate the frame head position before the adjustment may take effect.

According to one implementation, as illustrated in FIG. 4, the time for calculating the frame head position depends on the hardware GTR. Based on the calculation time, a time range for the adjustment to take effect (effective duration) may be determined, and the adjustment may be made within the effective duration. There is enough time to calculate the next frame head position in the second subcarrier spacing, and then the frame head may be adjusted according to the timing offset.

According to one implementation, in FIG. 5, the offset marked with number 3 marks a time range, which is the effective duration for adjusting SlotN. If the SlotN adjustment is made within the time range marked by the offset, the adjustment may take effect. If it exceeds the time range marked by the offset, the SlotN adjustment is invalid.

According to some embodiments of the disclosure, adjusting the time unit corresponding to the second subcarrier spacing according to timing offset includes adjusting a first time unit and/or a second time unit corresponding to the second subcarrier spacing according to the timing offset, in which the first time unit is a current time unit and the second time unit is a time unit after the first time unit.

In other words, after obtaining the timing offset, the terminal 101 usually does not immediately adjust the local time, but chooses the relatively suitable time to adjust the local time.

According to some embodiments, the second time unit may be any time unit after the current time unit, for example, the current time unit is SlotN, and the second time unit may refer to SlotN+1, SlotN+2 . . . . The adjustment of which slot depends on the UE implementation. If the adjustment effective duration of the current SlotN approaches the end position of SlotN, it may be adjusted at SlotN+1, SlotN+2 . . . to ensure that the UE has enough time to adjust.

According to some embodiments, the terminal 101 obtains a timing offset, and the terminal may choose to adjust on the current time unit or on the next time unit, etc., which is not limited in the disclosure.

For example, the timing offset obtained by the terminal 101 on SlotN may be used to adjust on the current SlotN or on the next SlotN+1.

According to some embodiments, the terminal 101 obtains multiple timing offsets, and the terminal 101 may choose to make one adjustment, two adjustments, or other multiple adjustments within the effective duration, which is not limited in the disclosure.

For example, the terminal 101 obtains two timing offsets on SlotN−1 and SlotN. One adjustment is made on SlotN and another adjustment is made on SlotN+1, or two adjustments are made on SlotN+1.

Step 303, an association relationship between a length of each time unit corresponding to the first subcarrier spacing and a length of each time unit corresponding to the second subcarrier spacing is determined.

According to some embodiments of the disclosure, the method further includes adjusting the time unit corresponding to the first subcarrier spacing according to the timing offset.

In other words, there is a corresponding relationship between frame head positions of different subcarrier spacing, which may be correlated and adjusted. For example, the slot length of the 15 kHz subcarrier spacing is twice that of the 30 kHz subcarrier spacing, and the slot length of the 15 kHz subcarrier spacing is four times that of the 60 kHz subcarrier spacing.

For example, according to some embodiments, the terminal 101 supports the application of subcarrier spacings of 15 kHz and 30 kHz. The first subcarrier may be 15 kHz or 30 kHz, and the ATC adjustment may be made based on the time unit corresponding to the 30 kHz subcarrier spacing as the reference, i.e. the second subcarrier spacing is 30 kHz.

In one scenario, as illustrated in FIG. 5, the subcarrier spacing currently used by the terminal 101 is 15 kHz, that is, the first subcarrier spacing is 15 kHz, and the corresponding slot length of 15 kHz is 1 ms. The terminal 101 tracks the reference signal sent by the network device 102 at the current subcarrier spacing of 15 kHz and obtains the timing offset. As illustrated by number 4, the timing offset is input within the adjustment effective duration of SlotN. As illustrated by number 5, after the timing offset takes effect, the frame header of SlotN or SlotN+1 may be adjusted. In detail, as illustrated by number 6, when adjusting, the slot corresponding to the 30 kHz subcarrier spacing is used as the reference. The slot length corresponding to the 30 kHz subcarrier spacing is 0.5 ms, and the slot length of the 15 kHz subcarrier spacing is twice the slot length of the 30 kHz subcarrier spacing. Therefore, as illustrated in FIG. 5, Slot N, are Slot 2N, Slot 2N+1, are aligned with each other in the time position. The timing offset obtained on 15 kHz is converted to a value on 30 kHz, the frame header of Slot2N+1 is adjusted, and it align SlotN+1 with Slot2N+2 and Slot2N+3 in the time position, the timing offset obtained on 15 kHz is converted to a value on 30 kHz, and the frame header of Slot2N+3 is adjusted.

In one scenario, as illustrated in FIG. 6, the subcarrier spacing currently used by the terminal 101 is 30 kHz, that is, the first subcarrier spacing is 30 kHz. The terminal 101 tracks the reference signal sent by the network device 102 at the current 30 kHz subcarrier spacing and obtains the timing offset. The offset illustrated by number 8 is the effective adjustment range of Slot2N. As illustrated by number 9, the timing offset is input within the effective adjustment range of Slot2N. When adjusting, using the slot corresponding to the 30 kHz subcarrier spacing as the reference, and as illustrated by numbers 10 and 11, the frame header of Slot2N or Slot2N+1 may be directly adjusted. At the time position aligned with 30 kHz and 15 kHz, it is equivalent to adjusting the frame header of SlotN at 15 kHz.

Step 304, carry system counting is performed on the time unit corresponding to the first subcarrier spacing according to the association relationship when the length of the time unit corresponding to the second subcarrier spacing as adjusted is reached.

According to some embodiments of the disclosure, the method further comprises: performing carry system counting on the time unit corresponding to the second subcarrier spacing when the length of the time unit corresponding to the second subcarrier spacing is reached.

In other words, there is a corresponding relationship between the frame head positions of different subcarrier spacing, which may be correlated and adjusted.

For example, according to some embodiments, the terminal 101 supports the application of subcarrier spacings of 15 kHz and 30 kHz. The first subcarrier may be 15 kHz or 30 kHz, and the ATC adjustment may be made based on the time unit corresponding to the 30 kHz subcarrier spacing as the reference, that is, the second subcarrier spacing is 30 kHz.

In one scenario, as illustrated in FIG. 5, the subcarrier spacing currently used by terminal 101 is 15 kHz, that is, the first subcarrier spacing is 15 kHz. If Slot2N+1 of the 30 kHz subcarrier spacing is adjusted from 0.5-1.0 ms to 0.5-1.3 ms through step 203, and the length of Slot2N+1 is reached to 1.3 ms, the slot number of the 15 kHz subcarrier spacing is counted from N to N+1. When the slot number range is exceeded, the frame number is carried forward. The slot number range corresponding to 15 kHz is 0-9. If N is 8, the slot number is counted from 8 to 9. If N is 9, the slot number is counted from 9 to 0, and the frame number is carried by 1. The slot number associated with the 30 kHz subcarrier spacing is counted from 2N+1 to 2N+2. The corresponding slot number range for 15 kHz is 0-19. If N is 8, the slot number is counted from 17 to 18. If N is 9, the slot number is counted from 19 to 0, and the frame number is carried by 1.

In another scenario, as illustrated in FIG. 6, the subcarrier spacing currently used by the terminal 101 is 30 kHz, that is, the first subcarrier spacing is 15 kHz. If Slot2N+1 of the 30 kHz subcarrier spacing is adjusted from 0.5-1.0 ms to 0.5-1.3 ms through step 203, and the length of Slot2N+1 is reached to 1.3 ms, the slot number of the 30 kHz subcarrier spacing is counted from 2N+1 to 2N+2. The corresponding slot number for 15 kHz is 0-19. If N is 8, the slot number is counted from 17 to 18. If N is 9, the slot number is counted from 19 to 0, and the frame number is carried by 1. Associatively, the slot number of the 15 kHz subcarrier spacing is counted from N to N+1, and the corresponding 15 kHz slot number is 0-9. If N is 8, the slot number is counted from 8 to 9. If N is 9, the slot number is counted from 9 to 0, and the frame number is carried by 1.

According to the above embodiments, when the terminal 101 uses 15 kHz and 30 kHz subcarrier spacings for the ATC adjustments, it adjusts and counts based on the 30 kHz subcarrier spacing as the reference, which may solve the problem of slot misalignment in the ATC adjustments of the terminal 101 in scenarios where different subcarrier spacings are used.

It should be emphasized that the above explanation of the method in the disclosure by the first subcarrier spacing of 15 kHz or 30 kHz and the second subcarrier spacing of 30 kHz as examples does not limit the application scope of the present solutions.

According to some embodiments of the disclosure, the terminal 101 may apply subcarrier spacings such as 15 kHz, 30 kHz, 60 kHz, 120 kHz, etc. The first subcarrier spacing is the subcarrier spacing currently used by terminal 101, which may be 15 kHz, 30 kHz, 60 kHz, or 120 kHz. The first subcarrier spacing may be the same as the second subcarrier spacing, and the second subcarrier spacing may be 30 kHz, 60 kHz, or 120 kHz, which is not limited in the disclosure.

Preferably, the second subcarrier spacing may be determined as the maximum subcarrier spacing supported by the terminal 101, so that the association adjustment and counting may be performed according to the association relationship between frame headers of different subcarrier spacings, and the problem of slot misalignment of ATC adjustments under different subcarrier spacings in the related art may be solved.

In conclusion, the timing control method provided in the disclosure is performed by the terminal 101 and includes: tracking, with a first subcarrier spacing, a reference signal sent by a network device 102, to obtain a timing offset; adjusting a time unit corresponding to a second subcarrier spacing according to the timing offset; determining an association relationship between a length of each time unit corresponding to the first subcarrier spacing and a length of each time unit corresponding to the second subcarrier spacing; and performing carry system counting on the time unit corresponding to the first subcarrier spacing according to the association relationship when the length of the time unit corresponding to the second subcarrier spacing as adjusted is reached, so that time units (such as slots or frames) corresponding to different subcarrier spacings may be adjusted and counted associatively and it may solve the problem of slot misalignment caused by the ATC adjustments of different subcarrier spacings in the related art.

Based on the embodiments in FIG. 2 or FIG. 3, FIG. 7 further illustrates a flow chart of a timing control method according to the disclosure, which is performed by the terminal 101.

As illustrated in FIG. 7, the method includes the following steps.

Step 401, a reference signal sent by a network device 102 is tracked with a first subcarrier spacing to obtain a timing offset.

Step 402, a time unit corresponding to a second subcarrier spacing is adjusted according to the timing offset.

Step 403, carry system counting is performed on a time unit corresponding to the first subcarrier spacing when a length of the time unit corresponding to the second subcarrier spacing is reached.

According to some embodiments of the disclosure, performing carry system counting on the time unit corresponding to the first subcarrier spacing when the length of the time unit corresponding to the second subcarrier spacing is reached includes: determining an association relationship between a length of each time unit corresponding to the first subcarrier spacing and a length of each time unit corresponding to the second subcarrier spacing; and performing carry system counting on the time unit corresponding to the first subcarrier spacing according to the association relationship when the length of the time unit corresponding to the second subcarrier spacing as adjusted is reached.

The specific implementation of the above embodiments refers to the embodiments in FIG. 2 or FIG. 3, and will not be repeated herein.

Step 404, first information is obtained, in which the first information is configured to indicate to perform a handover from the first subcarrier spacing to the second subcarrier spacing.

According to some embodiments of the disclosure, the first information may be a signaling or an information field, etc. The manner of obtaining the first information may be received by the terminal 101 from the network device 102, or in other ways, which is not limited in the disclosure.

According to some embodiments, the terminal 101 receives a downlink control information (DCI) indication from the network device 102. For example, the terminal 101 receives the DCI1_1 or DCI0_1 indication to perform the DCI-based BWP handover. The first information is included in the DCI instruction, which is used to indicate that the subcarrier spacing in the BWP is handed over from the first subcarrier spacing to the second subcarrier spacing.

According to some embodiments, the terminal 101 receives a radio resource control (RRC) signaling from the network device 102 to perform the RRC-based BWP handover. The first information is included in the RRC signaling to indicate that the subcarrier spacing in the BWP is handed over from the first subcarrier spacing to the second subcarrier spacing.

According to some embodiments, BWP-InactivityTimer (BWP idle timer) timing timeout, a random access (RA) process, etc. may also cause the BWP handover, leading to handover between different subcarrier spacings. For example, if BWP-InactivityTimer is set to 5 ms and the terminal 101 does not receive the scheduled DCI within 5 ms, a timer-based BWP handover will be performed.

It may be understood that when the BWP handover occurs, it will cause the handover among different subcarrier spacings. In the handover process among different subcarrier spacings, the solutions may adjust and count time units corresponding to different subcarrier spacings associatively, avoiding the problem of complex or impossible conversion of slot numbers corresponding to different subcarrier spacings during handover.

In conclusion, the timing control method provided in the disclosure is performed by the terminal 101 and includes: tracking, with a first subcarrier spacing, a reference signal sent by a network device 102, to obtain a timing offset;

adjusting a time unit corresponding to a second subcarrier spacing according to the timing offset; determining an association relationship between a length of each time unit corresponding to the first subcarrier spacing and a length of each time unit corresponding to the second subcarrier spacing; performing carry system counting on the time unit corresponding to the first subcarrier spacing according to the association relationship when the length of the time unit corresponding to the second subcarrier spacing as adjusted is reached; and obtaining first information, in which the first information is configured to indicate to perform a handover from the first subcarrier spacing to the second subcarrier spacing. Therefore, time units corresponding to different subcarrier spacings may be adjusted and counted associatively and it may also be used to solve the problem of slot misalignment caused by ATC adjustments of different subcarrier spacings as well as the problem of complex or impossible conversion of slot numbers corresponding to different subcarrier spacings when performing handovers on the subcarrier spacings.

Figure 8:
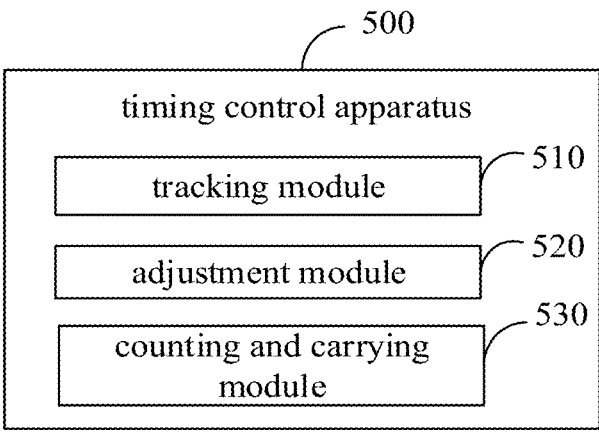
FIG. 8 is a block diagram of a timing control apparatus according to embodiments of the disclosure.

FIG. 8 is a block diagram of a timing control apparatus 500 according to embodiments of the disclosure. As illustrated in FIG. 5, the timing control apparatus includes: a tracking module 510, an adjustment module 520, and a counting and carrying module 530.

The tracking module 510 is configured to track, with a first subcarrier spacing, a reference signal sent by a network device 102, to obtain a timing offset.

The adjustment module 520 is configured to adjust a time unit corresponding to a second subcarrier spacing according to the timing offset.

The counting and carrying module 530 is configured to perform carry system counting on a time unit corresponding to the first subcarrier spacing when a length of the time unit corresponding to the second subcarrier spacing is reached.

According to some embodiments, the tracking module 510 is specifically configured to: receive, with the first subcarrier spacing, the reference signal sent by the network device 102; determine a sample point deviation corresponding to the reference signal; and determine the timing offset according to the sample point deviation.

According to some embodiments, the timing offset includes one or more timing offsets obtained on one or more time units corresponding to the first subcarrier spacing.

According to some embodiments, the adjustment module 520 is specifically configured to determine an adjustment effective duration for the terminal 101; and adjust the time unit corresponding to the second subcarrier spacing according to the timing offset during the adjustment effective duration.

According to some embodiments, the adjustment module 520 is specifically configured to adjust a first time unit and/or a second time unit corresponding to the second subcarrier spacing according to the timing offset, in which the first time unit is a current time unit and the second time unit is a time unit after the first time unit.

According to some embodiments, the counting and carrying module 530 is specifically configured to determine an association relationship between a length of each time unit corresponding to the first subcarrier spacing and a length of each time unit corresponding to the second subcarrier spacing; and perform carry system counting on the time unit corresponding to the first subcarrier spacing according to the association relationship when the length of the time unit corresponding to the second subcarrier spacing as adjusted is reached.

According to some embodiments, the adjustment module 520 is also configured to adjust the time unit corresponding to the first subcarrier spacing according to the timing offset According to some embodiments, the counting and carrying module 530 is also configured to perform carry system counting on the time unit corresponding to the second subcarrier spacing when the length of the time unit corresponding to the second subcarrier spacing is reached.

According to some embodiments, the apparatus 500 further includes an obtaining module configured to obtain first information, in which the first information is configured to indicate to perform a handover from the first subcarrier spacing to the second subcarrier spacing.

As the apparatuses according to embodiments of the disclosure correspond to the methods according to embodiments of the disclosure, the implementations of the methods may be also applicable to the apparatuses according to embodiments of the disclosure and it will not be described in detail according to embodiments.

In conclusion, the timing control apparatus according to the disclosure is configured at terminal 101. Through the tracking module, the adjustment module, and the counting and carrying module, time units corresponding to different subcarrier spacings may be adjusted and counted associatively and it may also be used to solve the problem of slot misalignment caused by ATC adjustments of different subcarrier spacings as well as the problem of complex or impossible conversion of slot numbers corresponding to different subcarrier spacings when performing handovers on the subcarrier spacings.

According to the above embodiments of the disclosure, the methods and apparatuses according to the embodiments of the disclosure have been introduced. In order to achieve various functions of the methods according to the embodiments of the disclosure, the electronic device may include hardware structures and software modules, and implement the above functions in the form of hardware structures, software modules, or hardware structures plus software modules. A certain function among the above-mentioned functions may be implemented in the form of a hardware structure, a software module, or a hardware structure plus a software module.

Figure 9:
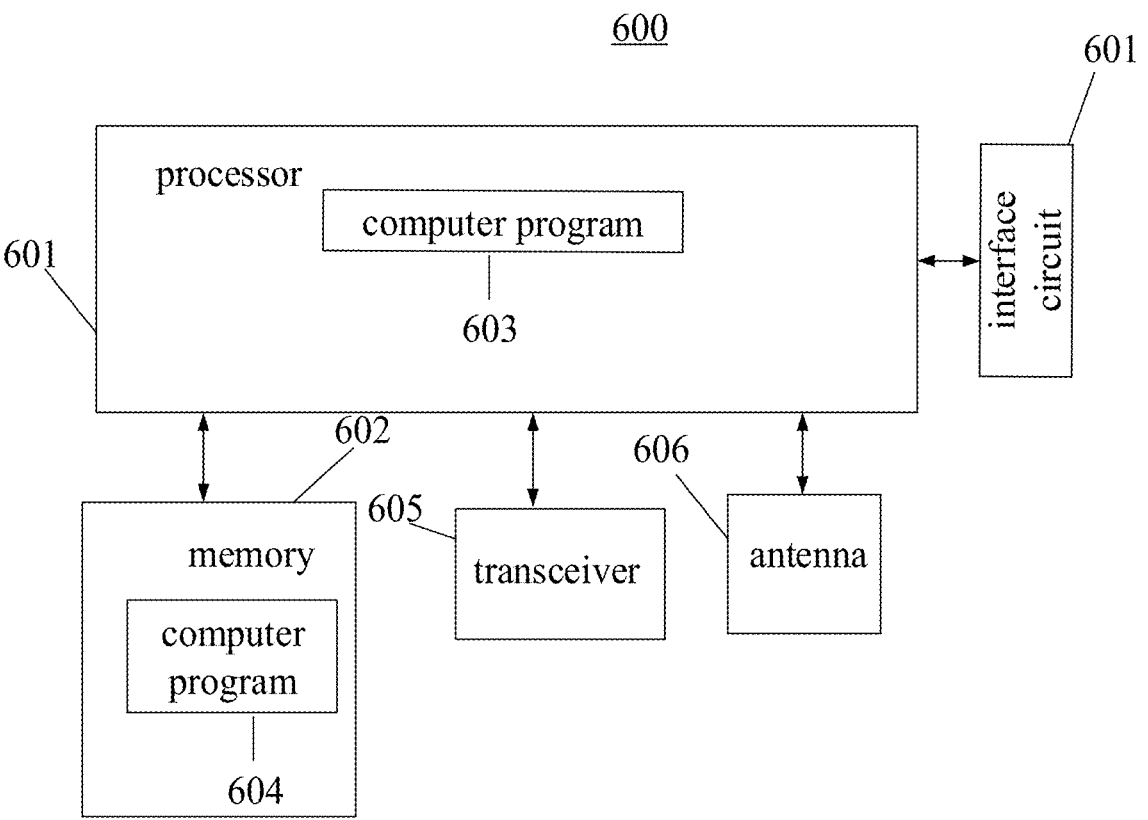
FIG. 9 is a block diagram of a communication device according to embodiments of the disclosure.

Reference to FIG. 9, which is a schematic diagram of a communication device 600 according to embodiments. The communication device 600 may be a network device, or a user device, or a chip, a chip system, a processor or the like that supports the network device to implement the above methods, or a chip, a chip system, a processor or the like that supports the user device to implement the above methods. This device may be used to implement the methods described according to the above method embodiments, and reference should be made to the above method embodiments.

The communication device 600 may include one or more processors 601. The processor 601 may be a general-purpose processor, a special-purpose processor, or the like. For example, it may be a baseband processor or a central processing unit. The baseband processor may be used to process communication protocols and communication data. The central processing unit may be used to control the communication device (such as a base station, a baseband chip, a terminal device, a terminal device chip, a DU, a CU, or the like), execute a computer program, process data of the computer program, and the like.

Optionally, the communication device 600 may further include one or more memories 602 on which a computer program 604 may be stored. The processor 601 executes the computer program 604, so that the communication device 600 executes the methods described according to the above method embodiments. Optionally, data may also be stored in the memory 602. The communication device 600 and the memory 602 may be provided separately or integrated together.

Optionally, the communication device 600 may further include a transceiver 605 and an antenna 606. The transceiver 605 may be referred to as a transceiver unit, a transceiver, a transceiver circuit, or the like, which is used to implement a transceiver function. The transceiver 605 may include a receiver and a transmitter. The receiver may be called a receiver or a receiving circuit or the like, for implementing a receiving function. The transmitter may be called a transmitter or a transmitting circuit or the like for implementing a transmitting function.

Optionally, the communication device 600 may further include one or more interface circuits 607. The interface circuit 607 is used to receive code instructions and transmit them to the processor 601. The processor 601 executes the code instructions to cause the communication device 600 to perform the methods described according to the above method embodiments.

In an implementation, the processor 601 may include a transceiver for implementing receiving and transmitting functions. For example, the transceiver may be a transceiver circuit, or an interface, or an interface circuit. The transceiver circuit, or the interface, or the interface circuit for implementing receiving and transmitting functions may be separate or integrated. The above-mentioned transceiver circuit, interface, or interface circuit may be used for reading and writing code/data, or the above-mentioned transceiver circuit, interface, or interface circuit may be used for signal transmission.

In an implementation, the processor 601 may store a computer program 603, and the computer program 603 runs on the processor 601 to enable the communication device 600 to execute the methods described according to the above method embodiments. The computer program 603 may be embodied in the processor 601, in which the processor 601 may be implemented by hardware.

In an implementation, the communication device 600 may include a circuit. The circuit may implement the functions of transmitting or receiving or communicating according to the foregoing method embodiments. The processor and the transceiver described according to the disclosure may be implemented in an integrated circuits (IC), an analog IC, a radio frequency integrated circuit (RFIC), a mixed-signal IC, an application specific integrated circuit (ASIC), a printed circuit board (PCB), electronic equipment, or the like. The processor and the transceiver may also be fabricated using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

The communication device described in the above embodiments may be a network device or a terminal device but the scope of the communication device described according to the disclosure is not limited thereto and the structure of the communication device may not be limited by FIG. 9. The communication device may be a stand-alone device or part of a larger device. For example, the communication means may be:

(1) a stand-alone IC, or a chip, or a chip system, or a chip subsystem;

(2) a set of one or more ICs, optionally, the set may also include a storage component for storing data and computer programs;

(3) an ASIC, such as a modem;

(4) a module that may be embedded in other devices;

(5) a receiver, a terminal device, an intelligent terminal device, a cellular phone, a wireless device, a handset, a mobile unit, an in-vehicle device, a network device, a cloud device, an artificial intelligence device, etc.;

(6) others.

Figure 10:
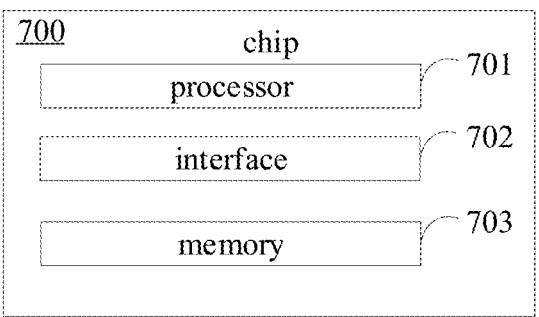
FIG. 10 is a block diagram of a chip according to embodiments of the disclosure.

For the case that the communication device may be the chip or the chip system, reference should be made to the schematic diagram of the chip structure illustrated in FIG. 10. The chip 700 in FIG. 10 includes a processor 701 and an interface 702. The number of processors may be one or more, and the number of interfaces may be more than one.

Optionally, the chip 700 also includes a memory 703, which is used to store necessary computer programs and data.

Those skilled in the art may also understand that various illustrative logical blocks and steps listed according to the embodiments of the disclosure may be implemented in electronic hardware, computer software, or a combination thereof. Whether such function is implemented in hardware or software depends on specific applications and overall system design requirements. Those skilled in the art may use various manners to implement functions for each specific application, but such implementation should not be understood as exceeding the protection scope of the embodiments of the disclosure.

The embodiments of the disclosure also provide a non-transitory computer-readable storage medium having stored therein computer instructions that cause a computer to perform the timing control method described according to the embodiments of the disclosure.

The embodiments of the disclosure also provide a computer program product, which includes a computer program. When the computer program is executed by a computer, the timing control method described according to the embodiments of the disclosure is performed.

According to the above-mentioned embodiments, it may be implemented in whole or in part by software, hardware, firmware, or any combination thereof. When it is implemented in software, it may be implemented in whole or in part in a form of computer program product. The computer program product includes one or more computer programs. When the computer programs are loaded and executed on the computer, flows or functions according to the embodiments of the disclosure may be generated in whole or in part. The computer may be a general purpose computer, a special purpose computer, a computer network, or other programmable device. The computer programs may be stored on a computer-readable storage medium or transferred from one computer-readable storage medium to another computer-readable storage medium, for example, the computer programs may be transferred from a website site, a computer, a server, or a data center over a wire (e.g. coaxial cable, optical fiber, digital subscriber line (DSL)) or wireless (e.g. infrared, wireless, microwave) means to another website site, another computer, another server, or another data center. The computer-readable storage medium may be any available medium that may be accessed by a computer or a data storage device such as a server, a data center, or the like that includes an integration of one or more available media. The available medium may be a magnetic medium (e.g., floppy disk, hard disk, magnetic tape), an optical medium (e.g., high-density digital video disc (DVD)), a semiconductor medium (e.g., solid state disk (SSD)), or the like.

Those skilled in the art may understand that the first, second, and other numeral numbers involved in the disclosure are only for the convenience of description, and are not used to limit the scope of the embodiments of the disclosure, which also represent a sequence.

At least one in this disclosure may also be described as one or more, which is not limited in this disclosure. A plurality of or multiple in this disclosure may be two, three, four, or more, which is not limited in this disclosure. According to the embodiments of the disclosure, for a type of technical features, the technical features are distinguished by "first", "second", "third", "A", "B", "C" and "D", etc. There is no order or order of magnitude for the technical features described in "first", "second", "third", "A", "B", "C" and "D", etc.

As used in the disclosure, terms "machine-readable medium" and "computer-readable medium" refer to any computer program product, apparatus, and/or device (such as a disk, an optical disc, a memory, a programmable logic device (PLD)) used to provide machine instructions and/or data to a programmable processor, which includes a machine readable medium that receives machine instructions as machine readable signals. The term "machine readable signal" refers to any signal used to provide machine instructions and/or data to the programmable processor.

The system and technology described herein may be implemented in a computing system that includes back-end components (such as serving as a data server), or a computing system that includes middleware components (such as an application server), or a computing system that includes front-end components (such as a user computer with a graphical user interface or web browser, through which users may interact with the implementation of the system and technology described herein), or a computing system that includes any combination of such back-end components, middleware components, or front-end components. The components of the system may be interconnected through any form or medium of digital data communication (such as communication network). An example of communication network includes a local area network (LAN), a wide area network (WAN), and the internet.

A computer system may include both a client and a server. The client and the server are generally far away from each other and typically interact through the communication network. The client-server relationship may be generated by running computer programs that have the client-server relationship on corresponding computers.

It should be understood that various forms of processes illustrated above may be used to be reordered, add steps, or delete steps. For example, the steps recorded according to the disclosure may be executed in parallel, sequentially, or in different orders, as long as the expected results of the technical solutions according to the disclosure may be achieved, which is not limited according to the disclosure.

Furthermore, it should be understood that various embodiments of the disclosure may be implemented separately or in combination with other embodiments as permitted by the solutions.

Those skilled in the art may realize that the units and algorithm steps described according to the embodiments disclosed herein may be implemented in electronic hardware or a combination of computer software and electronic hardware. Whether these functions are executed in hardware or software depends on the specific applications and design constraints of the technical solutions. Those skilled in the art may use different manners to achieve the described functions for each specific application, but such implementation should not be considered beyond the scope of this disclosure.

Those skilled in the art may clearly understand that, for the convenience and brevity of description, the specific working processes of the above-described systems, devices, and units may refer to the corresponding processes in the foregoing method embodiments, which will not be repeated herein.

The above are only specific implementations of the disclosure, but the scope of the disclosure is not limited to this. Those skilled in the art who is familiar with the technical scope disclosed in the disclosure may easily think of changes or replacements, which should cover within the scope of this disclosure. Therefore, the scope of the disclosure shall be subject to the scope of the claims.

What is claimed is:

1. A timing control method, performed by a terminal, the method comprising:

tracking, with a first subcarrier spacing, a reference signal sent by a network device, to obtain a timing offset;

adjusting a time unit corresponding to a second subcarrier spacing according to the timing offset; and performing carry system counting on a time unit corresponding to the first subcarrier spacing when a length of the time unit corresponding to the second subcarrier spacing is reached.

2. The method according to claim 1, wherein tracking, with the first subcarrier spacing, the reference signal sent by the network device, to obtain the timing offset, comprises:

receiving, with the first subcarrier spacing, the reference signal sent by the network device;

determining a sample point deviation corresponding to the reference signal; and determining the timing offset according to the sample point deviation.

3. The method according to claim 1, wherein the timing offset comprises one or more timing offsets obtained on one or more time units corresponding to the first subcarrier spacing.

4. The method according to claim 1, wherein adjusting the time unit corresponding to the second subcarrier spacing according to the timing offset comprises:

determining an adjustment effective duration for the terminal; and adjusting the time unit corresponding to the second subcarrier spacing according to the timing offset during the adjustment effective duration.

5. The method according to claim 1, wherein adjusting the time unit corresponding to the second subcarrier spacing according to the timing offset comprises:

adjusting a first time unit and/or a second time unit corresponding to the second subcarrier spacing according to the timing offset, wherein the first time unit is a current time unit and the second time unit is a time unit after the first time unit.

6. The method according to claim 1, wherein performing carry system counting on the time unit corresponding to the first subcarrier spacing when the length of the time unit corresponding to the second subcarrier spacing is reached comprises:

determining an association relationship between a length of each time unit corresponding to the first subcarrier spacing and a length of each time unit corresponding to the second subcarrier spacing; and performing carry system counting on the time unit corresponding to the first subcarrier spacing according to the association relationship when the length of the time unit corresponding to the second subcarrier spacing as adjusted is reached.

7. The method according to claim 1, further comprising:

adjusting the time unit corresponding to the first subcarrier spacing according to the timing offset.

8. The method according to claim 1, further comprising:

performing carry system counting on the time unit corresponding to the second subcarrier spacing when the length of the time unit corresponding to the second subcarrier spacing is reached.

9. The method according to claim 1, further comprising:

obtaining first information, wherein the first information is configured to indicate to perform a handover from the first subcarrier spacing to the second subcarrier spacing.

10. A chip comprising an interface circuit and a processor, wherein the interface circuit is configured to receive code instructions and transmit the code instructions to the processor, and the processor is configured to execute the code instructions to perform the method according to claim 1.

11. A communication device, comprising:

a transceiver;

a memory for storing computer-executable instructions; and a processor, configured to:

track, with a first subcarrier spacing, a reference signal sent by a network device, to obtain a timing offset;

adjust a time unit corresponding to a second subcarrier spacing according to the timing offset; and perform carry system counting on a time unit corresponding to the first subcarrier spacing when a length of the time unit corresponding to the second subcarrier spacing is reached.

12. The device according to claim 11, wherein the processor is further configured to:

receive, with the first subcarrier spacing, the reference signal sent by the network device;

determine a sample point deviation corresponding to the reference signal; and determine the timing offset according to the sample point deviation.

13. The device according to claim 11, wherein the timing offset comprises one or more timing offsets obtained on one or more time units corresponding to the first subcarrier spacing.

14. The device according to claim 11, wherein the processor is further configured to:

determine an adjustment effective duration for the communication device; and adjust the time unit corresponding to the second subcarrier spacing according to the timing offset during the adjustment effective duration.

15. The device according to claim 11, wherein the processor is further configured to:

adjust a first time unit and/or a second time unit corresponding to the second subcarrier spacing according to the timing offset, wherein the first time unit is a current time unit and the second time unit is a time unit after the first time unit.

16. The device according to claim 11, wherein the processor is further configured to:

determine an association relationship between a length of each time unit corresponding to the first subcarrier spacing and a length of each time unit corresponding to the second subcarrier spacing; and perform carry system counting on the time unit corresponding to the first subcarrier spacing according to the association relationship when the length of the time unit corresponding to the second subcarrier spacing as adjusted is reached.

17. The device according to claim 11, wherein the processor is further configured to:

adjust the time unit corresponding to the first subcarrier spacing according to the timing offset.

18. The device according to claim 11, wherein the processor is further configured to:

perform carry system counting on the time unit corresponding to the second subcarrier spacing when the length of the time unit corresponding to the second subcarrier spacing is reached.

19. The device according to claim 11, wherein the processor is further configured to:

obtain first information, wherein the first information is configured to indicate to perform a handover from the first subcarrier spacing to the second subcarrier spacing.

20. A non-transitory computer-readable storage medium having stored therein computer instructions that cause a computer to perform:

tracking, with a first subcarrier spacing, a reference signal sent by a network device, to obtain a timing offset;

adjusting a time unit corresponding to a second subcarrier spacing according to the timing offset; and performing carry system counting on a time unit corresponding to the first subcarrier spacing when a length of the time unit corresponding to the second subcarrier spacing is reached.

\* \* \* \* \*